June 12, 1962 W. H. MARSH 3,038,312
REGENERATIVE HYDRAULIC TORQUE MULTIPLICATION SYSTEM
Filed Sept. 29, 1958 8 Sheets-Sheet 1

INVENTOR
WALTER H. MARSH

BY
ATTORNEYS

June 12, 1962 W. H. MARSH 3,038,312
REGENERATIVE HYDRAULIC TORQUE MULTIPLICATION SYSTEM
Filed Sept. 29, 1958 8 Sheets-Sheet 8

INVENTOR
WALTER H. MARSH
BY
Strauch, Nolan & Neale
ATTORNEYS

United States Patent Office 3,038,312
Patented June 12, 1962

3,038,312
REGENERATIVE HYDRAULIC TORQUE
MULTIPLICATION SYSTEM
Walter H. Marsh, Pittsburgh, Pa., assignor to Rockwell Manufacturing Company, Pittsburgh, Pa., a corporation of Pennsylvania
Filed Sept. 29, 1958, Ser. No. 763,876
20 Claims. (Cl. 60—53)

This invention relates to hydraulic pump-motor systems and particularly relates to regenerative hydraulic torque multiplication systems capable of meeting speed and torque requirements of a variable load which, for example, can be used in numerous power drive systems including automatic transmissions.

The invention is concerned with transmissions that will eliminate the inefficiencies, noises and pulsations of previously known pump-motor circuits. It is normal practice to control speed of hydraulic motors by a throttling type, by-pass valve. In such by-pass valve systems, the energy of the recirculated fluid is dissipated in heat as it passes through the by-pass valve and associated conduits. This heat loss wastes the input power to the pump unit and in many cases requires the use of expensive heat exchangers to dissipate the heat loss. Other than the noted by-pass system, a single, variable displacement input pump has been used to furnish full capacity to a motor. When the size of the motor unit and desired speed output increases, the size of the variable volume pump must be increased and such large capacity pumps are either virtually impossible to obtain or the cost is so prohibitive as to render them effectively unavailable.

By using several double acting, rotary, positive displacement pumps with a common input drive, and motors in novel fluid circuit combination, this invention provides a transmission system which has quiet, non-pulsating, smooth, constant torque output as desired. It is a highly efficient and trouble free system capable of extended operational life. With two pumps, one of which is a variable displacement pump capable of acting as a motor, the effective capacity of a single large capacity variable displacement pump is provided at a relatively low expense. Systems are provided with accurate and dependable automatic controls. The system is capable of versatility in installations and is particularly applicable to installations such as fans, or agitator drives in processes where close speed control is desired. It is also extremely advantageous in power transmission for hoists and drill rigs, where the power source is operated at constant speed but may be variable. The inventive transmission system will meet the requirements of many industries, it can be operated at variable speed or constant load, it has pre-set speed selection with automatic torque-load compensation and can be adapted to single or multiple output drive installations and in automotive transmissions. In the multiple installations, motors may be used in parallel and each can be pre-set at its own desired speed.

Accordingly a primary object of this invention resides in the provision of a novel hydraulic regenerative torque multiplication system.

Another object resides in providing a novel hydraulic regenerative torque multiplication system used between a prime mover and a load in which system the prime mover drives a fixed displacement pump and a variable displacement pump unit also selectively capable of motoring operation and a novel fluid circuit between the fixed pump and the variable pump enables a positive displacement hydraulic motor to drive the load at constant speed with load variations being balanced by controlling the variable displacement pump-motor unit.

A further object resides in providing a novel hydraulic circuit for use as a transmission between a prime-mover and a load and having a fixed displacement pump, a positive displacement fluid motor with an output drive connection for connection to the load, pressure and return lines between the pump and motor, a mechanism connected in fluid communication between the pressure and return lines with a drive connection common to a drive connection for the fixed displacement pump and adapted to be drive connected to a prime mover, the mechanism being selectively alternatively operative to aid the fixed displacement pump in supplying pressure fluid from the return line to the pressure line or utilizing pressure and fluid flow from the pressure line to aid the prime mover by supplying regenerative power to the fixed displacement pump.

Still another object resides in providing a novel power train consisting of a prime mover drive connected to two positive displacement pumps, one of which is a fixed displacement pump and one of which is a controllable variable displacement pump, the two pumps and a positive displacement output fluid motor being connected by a parallel fluid circuit.

A still further object resides in providing a novel regenerative hydraulic torque multiplication system with at least two fluid pumps one of which is a fixed displacement pump and one of which is a variable displacement pump capable of being selectively varied to also act as a motor, an input power drive connection common to both pumps, a fluid motor with a capacity at least equal to the combined maximum pump output, a fluid circuit connecting all of the pumps and the motor in parallel and control means for the variable displacement pump enabling selective progressive variation of the pump from a full motoring condition to a full pumping condition whereby the system will develop a low flow-high pressure condition in the circuit when the variable displacement pump is motoring and a high flow-low pressure condition in the circuit when the variable displacement pump is pumping.

In conjunction with the preceding object it is a further object to provide novel automatic selective variation of the variable capacity pump in response to a system condition. It is a further object to provide in this latter novel automatic system a control mechanism to enable a preset desired fluid motor speed to be maintained.

Still another object resides in providing a novel hydraulic regenerative torque multiplication system in accord with the foregoing objects in which the variable displacement pump is a vane type pump having an adjustable pump chamber cylinder positioned by a servo-ram under control of an instrument controller responsive to minute changes in a system condition.

A still further object resides in providing a novel hydraulic regenerative torque multiplication system in accord with any of the foregoing objects wherein a multiplicity of positive displacement fluid motors are fluid connected in parallel with the two pumps, flow in each motor circuit being automatically regulated in response to associated motor speed and the variable displacement pump being automatically regulated in response to changes in combined output pressures of the two pumps.

A further object resides in providing a novel automatic hydraulic automotive transmission utilizing the basic hydraulic circuit of the foregoing objects and having the variable displacement pump selectively controlled in response to pump output pressure, and including provision of auxiliary circuits enabling automatic system operation even when the motor is overrunning the pump output flow and acting as a pump to create high pressure in the normal return line.

Further novel features and other objects of this invention will become apparent from the following detailed description, discussion and the appended claims taken in conjunction with the accompanying drawings, showing a preferred structure and embodiment, in which:

FIGURE 5 is a schematic diagram illustrating a system which uses the basic regenerative circuit of FIGURE 1 in an automatic automotive transmission;

It is to be understood that hereinafter, reference to fixed positive pump means a fixed positive displacement pump and reference to a variable positive pump means a variable positive displacement pump. Although the disclosed embodiments incorporate a fixed positive displacement motor, the motor could be another type of positive displacement motor; for example, a variable positive displacement type. However, because of the prohibitive cost considerations of presently known variable positive displacement motors in the capacity ranges desired, the proposed actual uses of these circuits will probably incorporate a relatively low cost fixed positive displacement motor. The terms "fixed displacement" and/or "fixed capacity" wherever appearing in this specification and the claims are used in the conventional sense applicable to positive displacement pumps where displacement or capacity of the pump per unit of stroke (be it reciprocal, rotary or otherwise) is fixed. Positive displacement pumps (either fixed or variable per unit stroke) are used in the sense as distinguished from varying capacity pumps (e.g., centrifugal pumps) where volume displaced per unit stroke varies widely (at a set speed) dependent upon the head against which the pump is working. In this connection the displacement and hence capacity of a positive displacement pump will remain essentially constant at a set pump operation speed if the pump is fixed.

In the following description, the basic regenerative transmission system and requisite components will be first described followed by a description of specific automatic control power transmission systems which utilize the basic circuit of FIGURE 1. Where applicable, similar reference numbers will be used to identify the same components in each of the systems.

Figure 1:
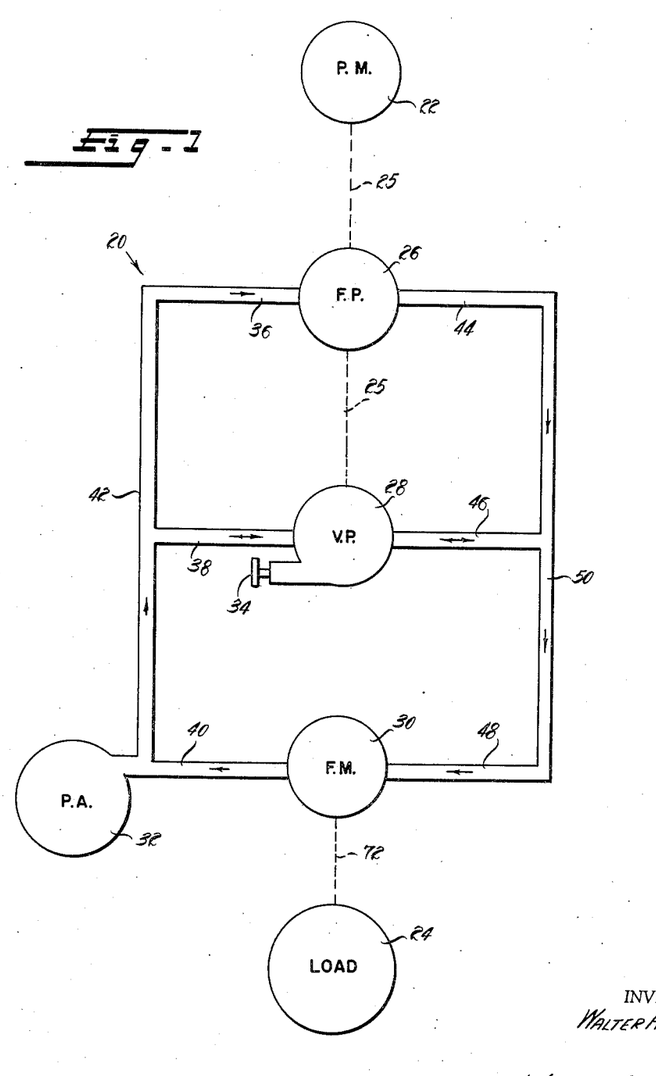
FIGURE 1 is a schematic diagram illustrating fluid components and circuits in a regenerative torque multiplication transmission system according to this invention.

With specific reference now to FIGURE 1, the regenerative hydraulic transmission system 20 has components and fluid lines providing a fluid circuit designed to transfer the power of a constant horsepower, constant speed, prime mover 22 into a drive force capable of meeting the speed and torque requirements of a variable load 24. The prime mover 22 may be any source of rotary motion at constant horsepower and speed, such as an electric motor, and the load 24 may be an agitator in a mixing chamber. Prime mover 22 is mechanically drive connected at 25 to two fluid pumps, a pump 26 of fixed positive displacement such as the unit disclosed in copending U.S. patent application Serial No. 322,916, now Patent No. 2,913,990 and a variable displacement pump 28, which can be a commercially available rotary, sliding vane pump modified for the purpose of this circuit. The variable displacement pump 28 (FIGURE 2) is provided with a positive, manual adjustment device 34 to radially shift the ring (or outer cylinder) 35 of the pumping chamber of the vane type pump.

The two pumps 26 and 28 are in parallel fluid communication with a fixed displacement motor 30, like the unit of the aforenoted Patent No. 2,913,990 and a pressure accumulator 32 is included in the low pressure side of the circuit to maintain a minimum pressure when the circuit is not in operation. Pumps 26 and 28 and motor 30 being connected in parallel, the intake 36 of pump 26, intake 38 of pump 28 and exhaust 40 of motor 30 are connected to a common conduit 42; and the outlet 44 of pump 26, outlet 46 of pump 28 and input 48 of motor 30 are connected to a common conduit 50.

The variable displacement (variable volume) pump 28 is designed to provide a range of output volumes varying from a maximum above zero to a minimum below zero, the latter being sufficient to receive the entire output flow of the fixed volume pump 26. In that latter case, variable pump 28 must act as a motor. Variable pump 28 accomplishes the transition between maximum volume displacement as a pump to maximum volume motor operation while its power shaft rotates in a constant direction by the radial shift of the cylinder 35. If the cylinder 35 is concentric about the rotor 52 there will be no pumping displacement and if the cylinder 35 is shifted radially to the position shown in FIGURE 2, it may receive a backward flow and act as a motor. As the cylinder 35 is shifted radially from the position shown in FIGURE 2 past a concentricity with rotor 52 toward the opposite eccentric position from that shown in FIGURE 2, pump 28 begins to act as a pump and will put out a greater volume until it reaches a maximum output volume when cylinder 35 is in the extreme opposite eccentric position from that shown in FIGURE 2.

Figure 2:
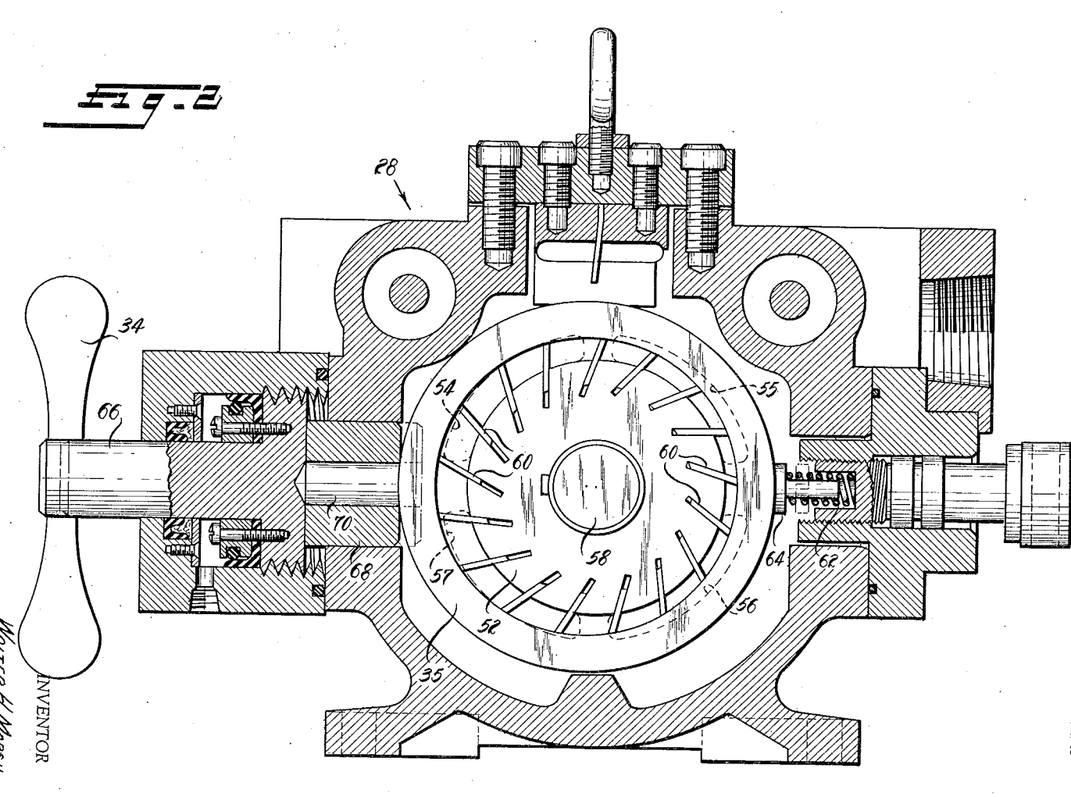
FIGURE 2 is a section view illustrating an exemplary type of variable volume pump, which can receive reverse flow and act as a motor, used, as the variable displacement pump in the system of FIGURE 1.

Structural details of a suitable vane type pump with a variable displacement outer cylinder are well known and will not be described in detail herein. Reference is made to U.S. Patent No. 2,764,941, if specific details of that type of pump are desired. It is sufficient here, that FIGURE 2 shows some basic details of construction of the variable displacement pump 28. Cylinder 35 is covered by a port plate which contains four ports 54, 55, 56 and 57, the locations of which are indicated by dotted lines. The port plate (not shown) is fixed so that it remains concentric with the rotor shaft 58. Thus, it may be seen from the location of the ports that, as the control cylinder 35 shifts radially, various ports or portions of the ports are covered or uncovered. The rotor 52, as viewed in FIGURE 2 will rotate in a clockwise direction and the vanes 60 are maintained in sliding contact with the inner surface of cylinder 35 by the centrifugal force (and/or other forces such as springs and hydraulic pressure) acting upon them. Since FIGURE 2 shows the pump 28 in a motoring position, fluid from line 46 (FIGURE 1) entering through port 57 would cause the rotor 52 to be rotated, and would leave the pump chamber through ports 54 to line 38. The ports 55 and 56 would be effectively closed off by cylinder 35 in full motoring position. When the pump 28 is in full pumping position, ports 55 and 56 are connected to inlet line 38 and to outlet line 46, respectively, and ports 54 and 57 are closed off.

The cylinder 35 is spring loaded by a spring 62 and plunger 64 toward the motoring position and pump operation creates pressure forces on the cylinder 35 which inherently bias the cylinder 35 toward motoring position. This feature is utilized in a later described embodiment. The force of spring 62 can be overcome by the manual control 34, which for the purposes of the basic circuit 20, may be considered to be a shaft 66 threaded into the pump housing, as indicated generally in FIGURE 1, with its abutment end 68 engaging the cylinder 35 and piloted on a stud 70 fixed radially on the outer periphery of cylinder 35.

The fixed displacement motor 30, as described, is placed in the line extending from the parallel grouping of the two pumps 26 and 28, and is connected by output shaft 72 to a load 24. Hydraulic motor 30, which is preferably the previously referred to unit, disclosed in Patent No. 2,913,990, has sufficient capacity to receive the combined output of fixed pump 26 and the maximum volume of variable pump 28. Operation of the system will now be explained.

Résumé of Operation, FIGURE 1 Embodiment

When rotation is initiated by prime mover 22, the cylinder 35 of pump 28 is in the eccentric motoring position, shown in FIGURE 2, which enables variable pump 28 to receive the entire output of fixed pump 26 through line 46. As fixed pump 26 pumps the fluid into conduit 50 the entire flow is received by variable pump 28 which acts as a motor and imparts the energy received from the fluid back into the common drive shaft 25 between pumps 26 and 28 and prime mover 22. When a rotation of load 24 is desired, the variable pump control cylinder 35 is shifted slightly toward the pumping position. Since variable pump 28 cannot then receive the entire output of fixed pump 26, a pressure begins to build up in the conduit 50 until the pressure becomes sufficiently high to cause hydraulic motor 30 to begin to turn, no matter how great a load (within motor capacity) is being moved. When motor 30 begins to move, it receives some of the flow of the fixed pump 26, and as the motor 30 then increases in speed, its torque becomes less and the pressure required to drive it is not as great as when it was at rest.

At this point, with the system in operation, the manual control 34 of variable pump 28 may be further adjusted past concentricity of cylinder 35 and the rotor 52 will begin to pump a slight amount of fluid into the line 46. As motor 30 then increases still further in speed, it will take more flow at lower pressure and variable pump 28 may be continually adjusted by control 34 until it is pumping at its maximum capacity. The output shaft 72 of motor 30 will then be turning at maximum speed under the combined flow from pumps 26 and 28.

It may be seen then that the basic system provides a high pressure, low flow condition to motor 30 to set it in motion from a condition of rest. The system is then capable of controlled variation through a progressive range until it provides a high flow, low pressure condition to run the motor 30 at its maximum speed.

The inclusion of the variable volume pump 28, placed in parallel in the pumping circuit is a great advantage over using a simple by-pass valve at that point. The variable pump can be selectively controlled to act as a motor so that a portion of the energy which is lost in circulating fluid while the load 24 is at rest can be restored to the common input drive shaft 25 of the pumps and the prime mover. After the load 24 is set in motion and required torque to move the load becomes lower with increased speed, the fact that the two pumps 26 and 28 may both supply fluid to the motor 30 allows motor 30 to achieve a greater speed than it could if it ran only on the fluid flow available from a single pump.

It is here pointed out that the entire control of the transmission circuit 20 rests in the adjustment of the pump chamber cylinder 35 by control 34. Any one of several methods of automatic control (in lieu of the manual control 34) may be used to position cylinder 35 so that the regenerative torque multiplication circuit 20 may be adapted to various uses.

Automatic Control Embodiments

Figure 3:
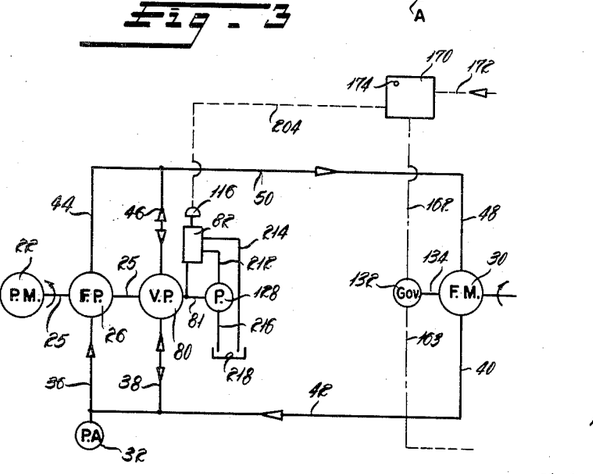
FIGURE 3 is a schematic diagram illustrating a system using the basic regenerative circuit of FIGURE 1 with automatic controls to provide pre-set speed selection and automatic torque load compensation.
Figure 4:
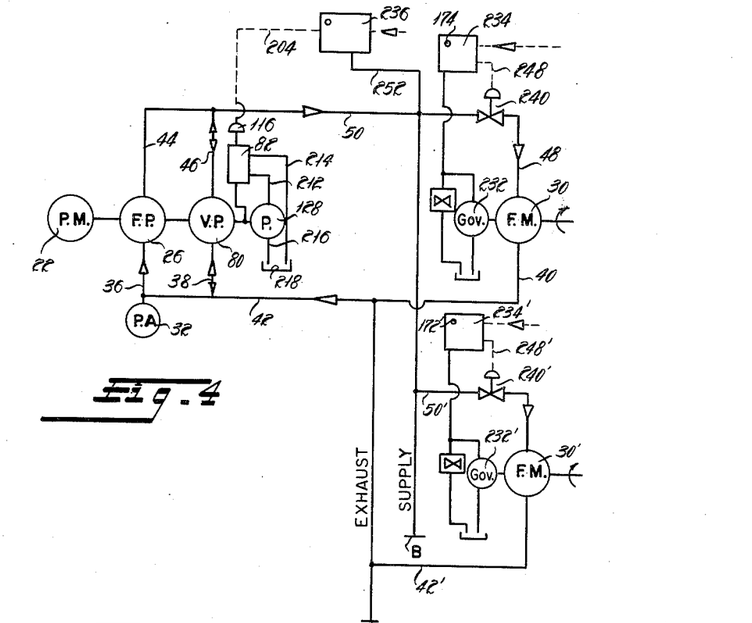
FIGURE 4 is a schematic diagram illustrating a system somewhat similar to FIGURE 3 but for use with multiple motor drives with each motor having its own pre-set speed selection.

Three automatic system embodiments are described hereinafter. Two of the system circuits are closely related and perform similar functions, one of these being a single motor system and the other being a multiple motor system. These two circuits are shown in FIGURES 3 and 4. The third automatic control system, FIGURE 5, utilizes the regenerative circuit with automatic controls as an automotive transmission.

FIGURES 3 and 4 will be recognized as including the basic regenerative circuit of FIGURE 1, described hereinbefore, with additional automatic controls. Both of these embodiments provide circuits designed to maintain fixed displacement hydraulic motors 30 at a preselected r.p.m. throughout a varying range of load conditions applied to the motor.

First Automatic Control Embodiment

Referring specifically to FIGURE 3, a fixed volume pump 26 and a variable volume pump 80 are drive connected to a common power shaft 25 and driven by a prime mover 22. The two pumps 26 and 80 are connected in parallel with the fixed volume motor 30, as has been previously described. The circuit shown in FIGURE 3 is particularly useful as an agitator drive (e.g., in a chemical process). The details of the components used to illustrate the circuit are exemplary, nevertheless such specific components are in use on an actual agitator drive. The illustrated components are commercially available instrument circuit components and may be interchanged to the extent that they are replaced with components that will produce a similar result.

Figure 6:
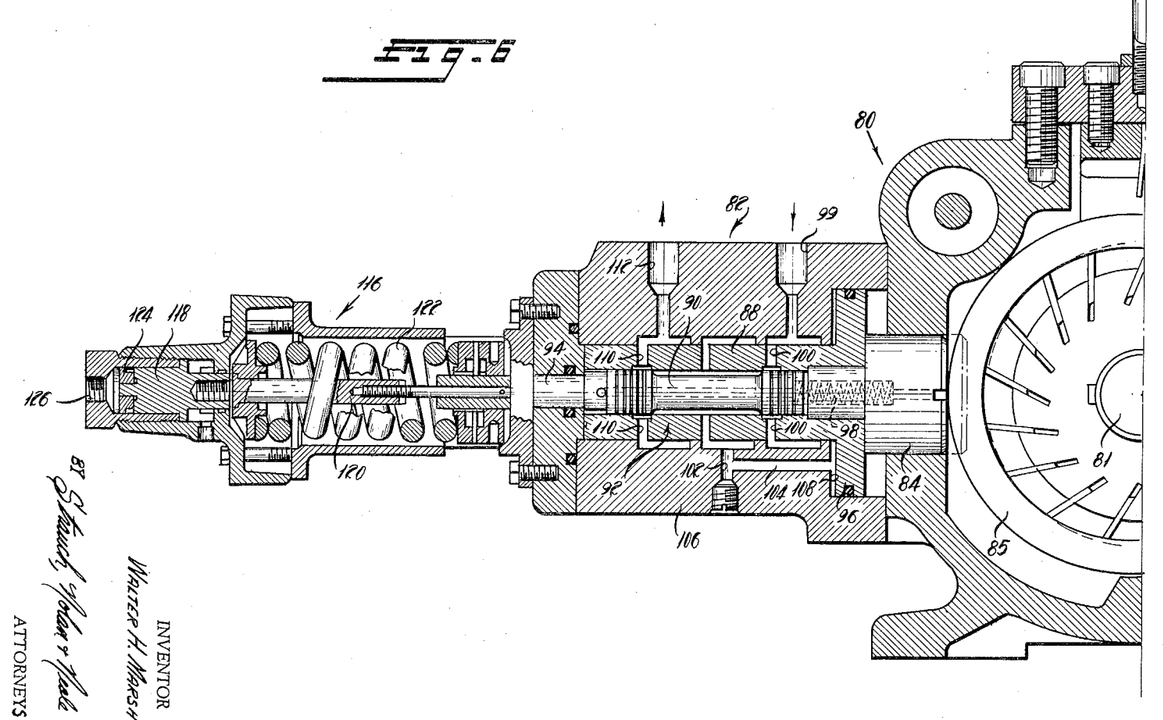
FIGURE 6 is a section view illustrating a variable displacement pump, of the type shown in FIGURE 2, however instead of a manual control of pump displacement it has been modified, to include a motor operated servo-ram pump displacement control, for use in the automatic systems of FIGURES 3–5.

The variable volume pump 80 is equipped with a servo-ram pump control, details of which are disclosed in FIGURE 6. Details of the variable volume pump 28 were disclosed with reference to FIGURE 2, and pump 80 is similar except for the servo-ram control. Comparing FIGURE 6 and FIGURE 2, it will be seen that servo-ram unit 82 replaces the screw type manual control 34 affixed to pump 28 in FIGURE 2. An adapter ram abutment member 84 now abuts the control ring 85 of the pump 80.

As in FIGURE 1, FIGURE 6 shows the variable pump 80 in its full motoring position—that is, receiving the entire output of fixed pump 26 (FIGURE 3). When ring 85 is moved to the right (FIGURE 6), the variable pump 80 (as a motor) accepts less and less fluid from fixed pump 26 (FIGURE 3), and then begins to pump fluid. When ring 85 finally reaches its eccentric limit position, opposite to that shown in FIGURE 6, the variable pump 80 is in its full pumping position, pumping its maximum fluid capacity. Servo-ram 82 thus controls the basic regenerative circuit of FIGURE 3 by controlling the variable volume pump 80.

Servo-ram 82 (FIGURE 6) operates on the servo-follower principle in that it has a sleeve extension 88 surrounding a spool member 90 to constitute a spool valve 92 in which the spool 90 is shifted axially by a force on its shaft 94. When so shifted, servo-ram control ports are uncovered to cause a working fluid pressure to position the hydraulic ram 96. For example, if a force is exerted to move shaft 94 to the right, the resilience of a spring 98 allows the spool 90 to move relative to the ram sleeve 88. This movement causes fluid under pressure, from inlet 99, to enter ports 100 in the ram sleeve 88, since they are now uncovered by the spool, and to flow through spool 90 between its lands, enter passages 102 and 104 in the servo-ram casing 106, and fill the annular chamber between ram 96 and servo casing shoulder 108 thus forcing the ram 96, abutment 84 and pump control cylinder 85 to the right. The movement of ram 96 will continue until its sleeve 88 once more occupies the same position relative to the spool 90 that is shown in FIGURE 6 and ports 100 are once again closed. The fluid which entered the annular chamber behind ram 96 will then be trapped, and ram 96 remains in its new position, until another movement of spool 90 takes place. When spool 90 is moved to the left, ports 110 communicate through the spool with passage 102, permitting fluid to be exhausted through outlet 112 as ram 96 returns to a position where its sleeve 88 closes ports 110, and stops.

Secured to the end plate of servo-ram 82, as by screws, is a pressure responsive spool positioning motor 116. This is a simple spring loaded reciprocating piston type motor, commercially available as turbine valve "top works." This can, as well, be a diaphragm type motor, the particular type being unimportant. It is sufficient description to note the piston 118, its rod 120, the loading spring 122 and piston chamber 124 with its feed line connection opening 126. An adjustable link, affixed to shaft 94 of the servo-ram control valve spool 90, is connected to the pressure responsive motor piston rod 120. This positioning motor 116 serves to axially position the servo-ram spool 90 in response to a variable control pressure of fluid introduced into positioning motor port 126.

Affixed to the variable pump rotor shaft 81 (FIGURE 3) is an accessory pump 128 which provides the operating fluid pressure to port 99 of servo-ram 82 to operate the ram 96 in response to a movement of the spool valve 92. Shown in FIGURE 3, the pressure accumulator 32 provides a preselected minimum pump inlet pressure to prevent cavitation of the fluid and also serves as a fluid reservoir in the circuit.

Figure 8:
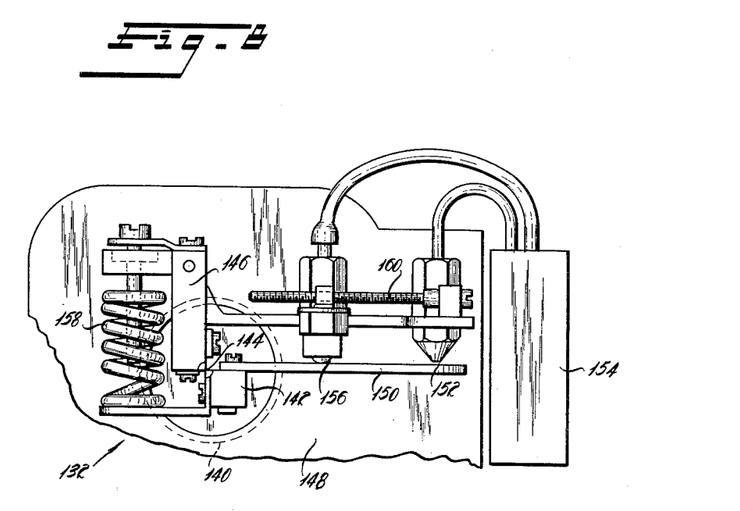
FIGURES 8 and 9 are respective top plan and side elevation views of a pneumatic speed transmitter which is used as a governor control in the systems of FIGURES 2 and 3.

A governor control 132 (FIGURE 3 and FIGURES 8 and 9) is fixed to the shaft 134 of hydraulic motor 30 to develop and transmit a signal which is proportional to the speed of hydraulic motor 30. This governor control 132 is a commercially available unit known as a pneumatic speed transmitter and it is to be understood that similar suitable devices, providing equivalent condition responsive signals, could be used in place of this exact unit. Briefly, governor control unit 132 has an input shaft 136 (FIGURE 9) drive connected to the hydraulic motor shaft 134. Governor shaft 136 is drive connected to and carries a multi-pole permanent magnet 138. A non-magnetic alloy disc 140 of high permeability is fixed to a post 142, which has a flexible disposition, being held in place by flexure mounts 144 fastened to a block 146 which is rigidly secured on a keeper plate 148. Disc 140 is thus angularly, flexibly maintained between the magnet 138 and keeper plate 148, and when input shaft 136 rotates the magnet 138, the magnetomotive pull on disc 140 tends to turn it in the same direction as the rotation.

Figure 9:
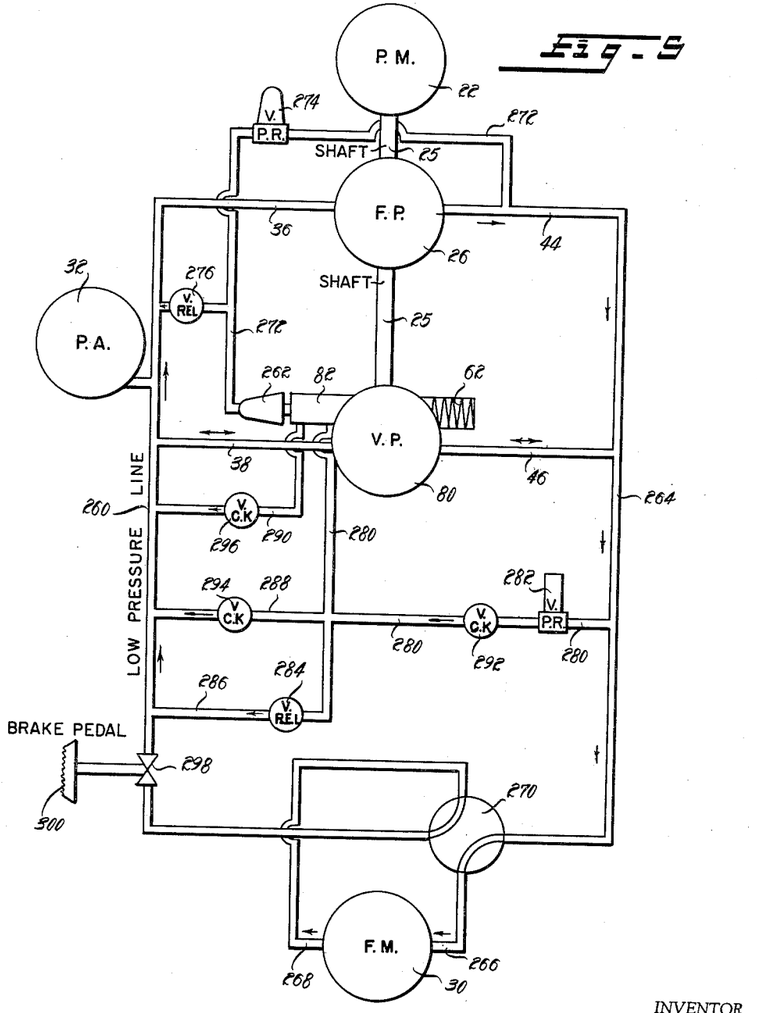

This pull positions a force bar 150 attached to the disc in relation to a nozzle 152, and causes an increase in back pressure in air flow through the nozzle. The back pressure, amplified by a fluid relay 154, produces an output pressure in line 162 which is the transmitted fluid pressure signal. Line 163 is a fluid feed line from a supply source.

The output pressure is also connected to a ball feedback unit 156 which rides against force bar 150 producing a moment to balance the torque on disc 140 produced by the magnetomotive pull. The feed-back unit 156 is a small open-ended cylinder in which a ball acts as a free floating piston.

Since the magnetomotive pull is proportional to the speed of rotation of the magnet 138, the output pressure in line 162 is also proportional to this speed. The zero spring 158 is adjusted to produce the desired output pressure in line 162 at zero rotation. The relation of the ball feed-back unit 156 to the axis of the disc 140 is determined by a fine-range adjustment screw 160.

Figure 7:
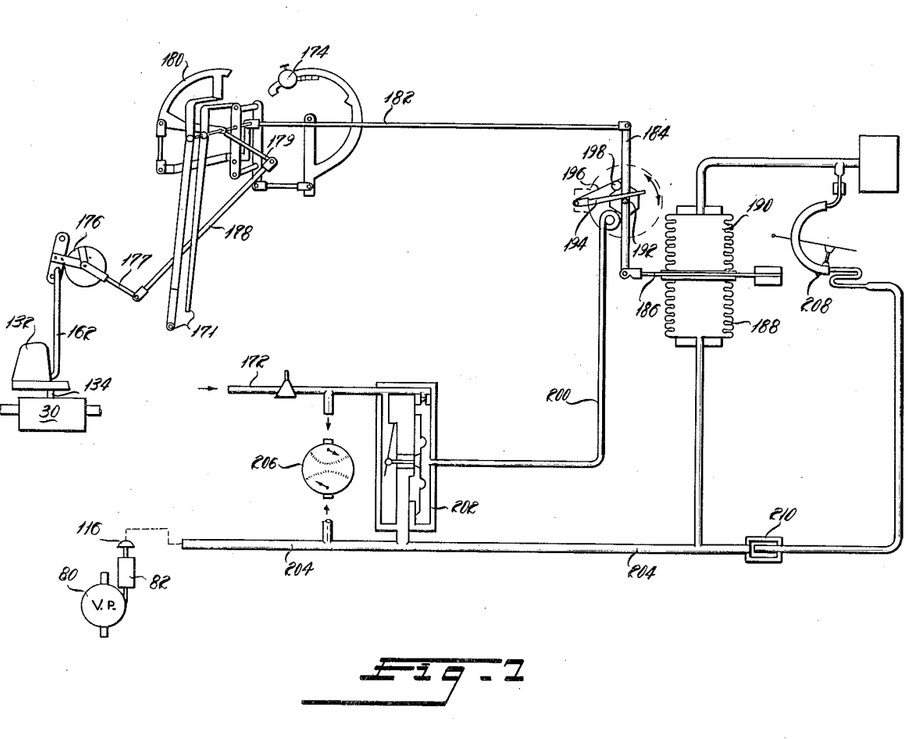
FIGURE 7 is a schematic diagram showing details of a suitable controller for use in the systems of FIGURES 3 and 4.

Shown in FIGURE 3 and in detail in FIGURE 7, the speed-regulated pressure from governor control 132 is conducted through line 162, to a pneumatic type instrument controller 170. The configuration of instrument controller 170 is shown as a proportional plus reset stabilized controller.

Controller 170 is a chart recording instrument, with pens 171, that receives a variable pressure signal through line 172. A set control point is fixed by manipulation of the control setting index knob 174.

A pressure signal from governor control unit 132 through line 162 acts on a pressure measuring element 176 (FIGURE 7) which through a linkage 177, 178, 179 operates the lever 180 and pens 171. Lever 180 through rod 182 shifts a proportioning lever 184 which is pivoted on plate 186 secured between a proportioning bellows 188 and a reset bellows 190. As lever 184 moves about its pivot, a striker pin 192 shifts relative to striker arm 194 and moves a valve flapper 196 toward its nozzle 198. Back pressure from nozzle 198 in line 200, through a pressure relay 202 causes pressure in line 204 to increase. Line 204 is connected to the servo-ram motor 116 at its port 126 (FIGURE 6). Item 206, between lines 172 and 204 is a dual pressure indicator, affording a visual check on input and outlet lines pressures of relay 202.

Proportioning bellows 188 is connected directly to control pressure line 204 and the reset bellows 190, through an adjustable reset resistance 208 and a filter 210, is also connected to control pressure line 204.

The mechanism is so arranged that when the pen 171 and control index 174 are together, the flapper 196 will be tangent to the nozzle 198 only when the pressure in the reset bellows 190 is equal to the pressure in the proportioning bellows 188.

When the pen moves up scale, the flapper 196 moves toward the nozzle and the relay output pressure in line 200 increases from, say, nine lbs. to eleven lbs. However, there will now be a two lb. differential between the proportioning and reset bellows 188 and 190 and, in order for the proportioning lever to maintain the flapper tangent to the nozzle, this differential must be maintained. Because the two bellows are connected through reset line resistance 208 and filter 210, fluid will flow into the reset bellows 190 to build up its pressure. To maintain the diffenential, then, the relay output pressure must gradually increase.

When the pen returns to the control point, set by index knob 174, the pressure in the proportioning bellows 188 reduces two lbs. thus equalizing the pressure in the two bellows. But, because the pressure in the reset bellows 190 has built up to a new value, this equalized pressure is now more than nine lbs.—the actual increase depending on the length of time the pen has been away from the control point.

In this manner, automatic reset action changes the relationship between valve position and measurement.

Reset "time" can be varied by adjusting the reset resistance 208. On fast processes, where fast reset times are required, the resistance is reduced. On slow processes where long resetting time is required, it is increased.

Flapper 195 need move only .0006" to change relay output pressure from, for example, 3–15 p.s.i., and thus the slight deviation of control pens 171 in response to signals in line 162 will cause flapper 196 to move from full open position to valve closed position. Controller 170 then produces a signal in line 204 which is inversely proportional to the signal received from governor control 132 through line 162. For example, if the pressure signal in line 162 decreases, the pen linkage and rod 182 move the nozzle 198 and flapper 196 closer together so that less input pressure from line 172, via line 200, is bled through the nozzle 198 and a greater portion of the input pressure from line 172 is directed to line 204 by the control relay 202. The desired pressure in line 204 is set by knob 174 enabling the system operator to select the speed of the hydraulic motor 30. The instrument controller 170 then attempts to maintain the pre-selected pressure by means of the force balance method just described. Controller 170 is a standard, commercially available instrument controller and its details other than its use in the system combination are not part of this invention.

*Résumé of Operation, FIGURE 3 Embodiment*

Having described the components of the circuit of FIGURE 3, its manner of operation should be readily understood. The prime mover 22—usually an electric motor in the case of the circuits of FIGURES 3 and 4—drives the pumps 26 and 80 at a constant angular velocity. The servo spool valve 92 of the variable pump servo-ram 82 is positioned by the motor 116 according to the pressure in line 204. The desired pressure in line 204 is predetermined by the setting knob 174 of instrument controller 170. Accessory pump 128—operating in its own closed circuit of lines 212, 214 and 216 and fluid reservoir 218—positions the servo-ram 82 of the pump to follow the servo-spool valve 92, as has been described.

When the pressure in line 204 is pre-selected, as described, the resulting position of the servo-ram 82 will control the amount of fluid that drives, or alternately, is pumped by the variable pump 80. Both pumps 26 and 80 can pump fluid into line 48 to cause the motor 30 to be driven. Since the governor control 132 is fixed to the motor shaft 134, the signal transmitted by it into the pressure signal line 162 to controller 170 will remain constant so long as the speed of motor 30 remains constant.

As has been aforedescribed, this particular circuit has been used as an agitator drive where a constant speed of the motor 30 is essential. With the circuit operating in the manner just described, the predetermined desired speed is set and the instrument control 170 maintains that speed in response to a signal from the governor control 132. As an example of this, let us consider the condition which occurs when a greater load is imposed upon motor 30 as, for instance, when the viscosity of a batch in which the agitator is operating increases.

As the load on motor 30 increases, the motor begins to lose speed. This loss in speed causes the pressure signal generated in line 162 by the governor control 132 to diminish. When the pressure signal in line 162 decreases, the flapper and nozzle of instrument controller 170 are moved closer together, causing an increase in pressure in line 204. Pressure increase in line 204 moves the positioning fluid motor 116 causing the servo-ram valve spool 90 to move further into the servo-ram 82, and the ram 96 (FIGURE 6) then moves toward the pump 80 which, as previously described, causes pump 80 to pump more fluid to motor 30 to increase its speed back to the desired value even though the load imposed upon it is greater.

If a different constant speed is desired, the knob 174 of instrument controller 170 is adjusted to change the initial setting of the instrument controller which, through its flapper valve changes the initial pressure in line 204. If a very low speed of motor 30 is desired, a small enough pressure may be set in line 204 to allow variable pump 80 to receive fluid and act as a motor rather than as a pump. In this event, only a portion of the fluid pumped by fixed pump 26 will enter high pressure line 50 to motor 30, the rest of the fluid being accepted through line 46 and recirculated through variable pump 80, which is now motoring, which returns the energy of the recirculated fluid to the common shaft 25 of the prime mover 22 and the two pumps 26 and 80.

In effect, the two pumps 26 and 80 serve as one large capacity variable volume pump. Such large capacity variable volume pumps are either impossible to obtain or else very expensive. Thus, the two relatively inexpensive smaller pumps may serve as a single large variable displacement pump in this invention.

Further, this FIGURE 3 circuit has the advantage of not dissipating energy as occurs in systems utilizing a throttling type, fluid by-pass valve to control the speed of a hydraulic motor. In such by-pass systems, the energy of the recirculated fluid is dissipated in heat as it passes through the by-pass valve and associated conduits. This heat loss wastes the prime mover input power and further, requires the use of expensive heat exchangers to dissipate the heat loss. In the present circuit, the recirculated fluid does useful work by returning energy to the common drive shaft and thus reduces the initial input power to the circuit.

*Second Automatic Circuit*

Referring to FIGURE 4, it will be seen that the illustrated circuit includes the basic FIGURE 1 circuit and is very similar to that of FIGURE 3 in that it produces the same type of constant speed drive. The circuit of FIGURE 4, however is different from FIGURE 3 in that it enables a multiple motor installation with each motor drive at its own pre-selected constant speed.

The components of the circuit of FIGURE 4, are, for the most part, the same as those for FIGURE 3, e.g., the prime mover 22, fixed pump 26, variable pump 80 with servo-ram 82 and servo-ram control position motor 116, the auxiliary pump 128 with closed circuit components 212, 214, 216 and 218, fluid motor 30, basic fluid circuit lines 36, 38, 40, 42, 44, 46, 48 and 50 and pressure accumulator 32. The two governor controls 232 and 232' are identical to governor 132 of FIGURE 3 but their signal pressure lines are connected to the respective controllers 234 and 234' in a different manner, therefore these components have been given different reference characters. The details and mode of operation of these components are described hereinbefore and will not be repeated.

The instrument controllers 234 and 234' are exactly as has been previously described for controller 170, and a pressure controller 236 is another unit like controller 170. All controllers 170, 234, 234' and 236 are identical in every respect.

Figure 10:
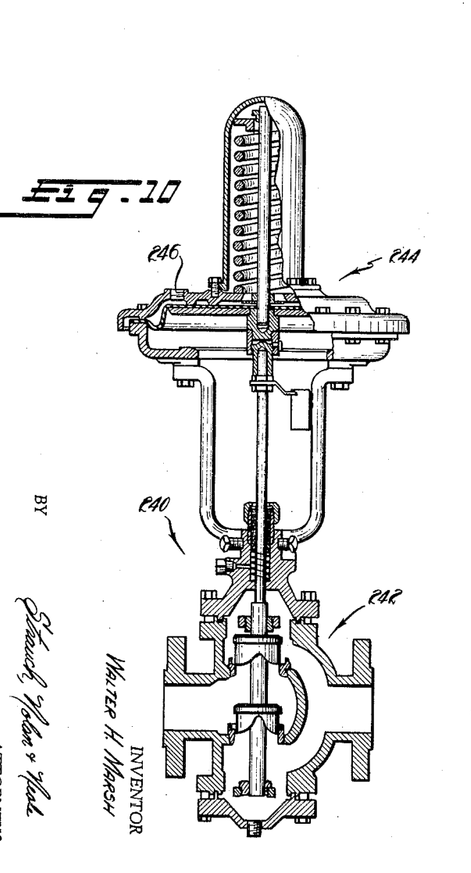
FIGURE 10 is a section view illustrating an exemplary fluid motor controlled throttling valve such as can be used with the governor control in the system of FIGURE 4.

Included in the circuit of FIGURE 4 are individual motor operated control valves 240 and 240' in the input lines 48 and 48' to the rotary hydraulic motors 30 and 30'. Valve units 240 and 240' are identical and can have the structure, or its equivalent, as shown in detail in FIGURE 10. These valves 240 and 240' are simple fluid motor controlled throttling valves and may be of almost any type in which the valve can be moved to positions between open and closed and maintained at the desired position by the motor. Valve unit 242 is a balanced plug valve and its motor unit 244 is a spring loaded diaphragm type motor with a fluid pressure connection, 246. The valve 242 is spring biased to its open position, and pressure introduced at connection 246 will move the valve 242 toward a closed position.

The governor controls 232 and 232' of individual rotary hydraulic motors 30 and 30' are each connected (FIGURE 4) to their respective control valves 240 and 240' at connections 246 by a pressure signal line 248 and 248'. When motor speed decreases due to an additional load on a motor (30 or 30'), a decreased pressure signal is transmitted by the governor and controller, through line 248 or 248' to the appropriate valve 240 and 240', causing it to open further under spring bias and allow an increased flow from conduit 50 into the appropriate motor 30 or 30'. As in the FIGURE 3 circuit, the speed of the individual motors, 30 or 30' is fixed by the initial setting of the control knob 174 or 174' of the appropriate instrument controller 234 or 234'.

In order to compensate for the changes in load on the motors 30 and/or 30', and hence the variable flow through the motors, the high pressure line 50 of the basic regenerative system circuit is held at an optimum pressure which is controlled by the pressure controller 236. This controller 236 received a pressure signal directly from the high pressure line 50 of the basic circuit through a line 252. As a pressure signal input to controller 236, line 252 corresponds to line 162 of FIGURE 3 controller 170. If loads should be imposed upon the motors 30 and/or 30', their respective control valves 240 and/or 240' would cause an increased flow of fluid through the appropriate motors 30 and/or 30'. This increase in flow would result in a pressure drop in the high pressure line 50. This drop, signalled through line 252 would trigger a response in the pressure controller 236 which would force the servo-ram 82 of variable pump 80 to cause the variable volume pump to consume less motoring fluid from, or to pump more fluid to, pressure line 50 to compensate for the pressure drop. Thus, it may be seen that there are actually two control steps, the first of which, through controller 234 or 234' controls the speed of the individual motors, 30 or 30', and the second of which, through controller 236, controls the overall system pressure by controlling the variable pump 80. As shown, FIGURE 4 has only two driven motors 30 and 30'. The input line 50' and exhaust line 42' to second motor 30' are merely connected in parallel to the basic circuit conduits 50 and 42 and additional similar motor and control units could be added, for example, to exhaust and pressure manifold lines A and B respectively up to a practical number of units, considering the maximum power and pump displacements that are available.

As in the circuit of FIGURE 3, the variable pump 80 of FIGURE 4 can function as a motor if all of the motors 30 and 30' are run at very slow speed. All the advantages of the circuit outlined in connection with FIGURE 3 also apply for FIGURE 4.

*Third Automatic Embodiment*

The third regenerative circuit to be described is an automatic automotive transmission illustrated in FIGURE 5. The basic regenerative circuit of FIGURE 1 with the prime mover 22—in this case it would normally be an internal combustion engine—the fixed displacement pump 26 and the variable displacement pump 80, all connected on a common power shaft connection 25, and a fixed displacement motor 30, fluid connected in parallel with the pumps 26 and 80, is easily recognized. This circuit, as in the case of the others which have been described, has a pressure accumulator 32 in the low pressure line 260 of the circuit to provide a predetermined minimum pressure at the pump inlet lines 36 and 38.

The fixed displacement pump 26 and fixed displacement motor 30 are preferably both of the type disclosed in aforementioned U.S. Patent No. 2,913,990. The variable volume pump 80 is the vane type pump 28 as previously described equipped with servo-positioner control 116 to position the servo-spool of the servo-ram 82. Since the control fluid connection to the servo-ram position controller 262 is different from the previous circuits a different reference number is used. The variable pump 80, as was previously described, is spring loaded by its biasing spring 62 to its motoring position and further, as is a characteristic of such a vane type pump, when fluid passes through the pump the pressure reaction on the rotor also tends to force it toward the motoring position.

Connected in the circuit between the high pressure line 264, the low pressure line 260 and between the input line 266 and exhaust line 268 of the hydraulic motor 30, is a reversing valve 270 which may reverse the direction of fluid flow to motor 30 in a well known manner. With the valve 270 positioned as shown in FIGURE 5, the flow to motor 30 is from right to left. If valve 270 were rotated 90°, high pressure line 264 would communicate with motor line 268, low pressure line 260 would communicate with motor line 266 and the flow of fluid to motor 30 would be reversed causing reverse rotation of the motor, as is desirable in automotive transmissions.

Figure 12:
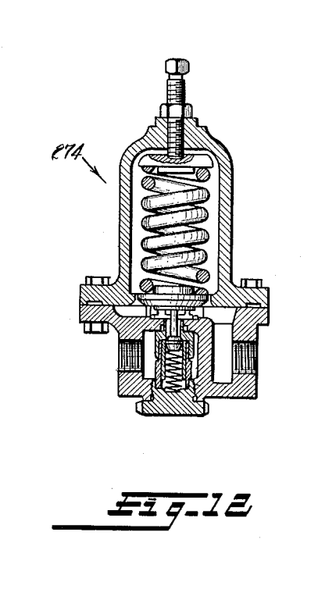

At the top of FIGURE 5, a tap-off 272 from high pressure line 264 communicates with the servo-ram fluid motor position controller 262 through a pressure reducing valve 274. Details of a suitable, commercially available pressure reducing valve 274 are illustrated in FIGURE 12. Many suitable such valves are available and no need of description exists. This reducing valve 274 serves to reduce the pressure through line 272 and also to limit the pressure, admitted to fluid motor servo-ram position controller 262, to a predetermined maximum. A pressure relief valve 276 connected between low pressure line 260 and a point in line 272 between the pressure reducing valve 274 and controller 262, is set at the same maximum pressure as the reducing valve 274 and serves as a safety valve in case reducing valve 274 should not limit the maximum pressure in line 272 for any reason.

Figure 11:
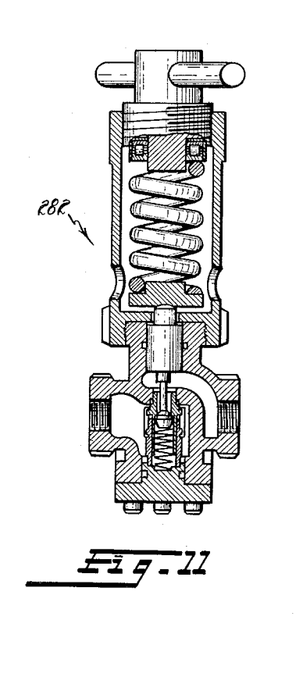
FIGURES 11 and 12 are section views illustrating pressure valves of the type utilized in the automatic automotive transmission system of FIGURE 5.

A line 280 tapped from high pressure line 264 provides the fluid pressure to operate the servo-ram 82 of variable pump 80. Line 280 passes through a pressure reducing valve 282 somewhat similar to the pressure reducing valve 274. It is a commercially available item and details are shown in FIGURE 11. Reducing valve 282 is set to allow a higher pressure into line 280 than the reducing valve 274 will allow to pass into line 272. Line 280 is also connected through a pressure relief valve 284, in a line 286, to the low pressure line 260, which acts as a safety back-up for the pressure reducing valve 282. The line 280 further communicates with a line 288 which is also connected to the low pressure line 260 of the basic regenerative circuit. Exhaust from the servo-ram 82 is also connected to the low pressure line 260 through a line 290. Each of lines 280, 288 and 290 contain one-way check valves 292, 294 and 296, respectively, for purposes which will be described.

At the low pressure side of motor 30 (with valve 270 positioned as shown), a throttling valve 298 is placed in low pressure line 260. The throttling valve 298 is connected to the vehicle brake pedal 300 so that, when the brake is applied, the throttling valve 298 closes. The purpose of this throttling valve 298 will become apparent.

Operation of the circuit of FIGURE 5 will now be described and in the description, various vehicle driving conditions will be reviewed.

First, the vehicle will be considered at rest with the engine 22 idling. Both the fixed pump 26 and variable pump 80 are turning at engine idling speed. Variable pump 80 will be in the full motoring position—that is, it will receive the entire output of the fixed pump 26— and fluid will circulate from the fixed pump 26 through lines 44, 264, 46, the variable pump 80, lines 38, 260, 36 and back through the fixed pump 26. If the engine 22 is accelerated, there will be a surge of pressure in line 264 which will be sensed immediately in tap-off line 272, from the outlet side of the fixed pump 26, and directed through line 272 and pressure reducing valve 274, to the fluid motor servo-ram positioner control 262. This pressure surge will control and cause the servo-ram 82 to operate and force the ring cylinder of variable pump 80 toward the pumping station.

With the variable pump 80 moved away from its full motoring position, pump 80 will no longer accept the entire output of fluid from the fixed pump 26 and so the pressure in line 264 will increase still further. When the vehicle is stopped (at rest) motor 30 will require its greatest torque to place the vehicle in motion. Since the dispacement of hydraulic motor 30 is fixed, the torque must result from an increase in fluid pressure to the motor 30. Thus, as the variable pump 80 is forced toward its pumping position, and accepts less of the fluid from the fixed pump 26 and the pressure in line 264 increases, the required starting torque will be developed in motor 30.

At initiation of the vehicle starting condition, there will be little or no flow through the motor 30, and it is therefore undesirable to allow the servo-ram 82 to be forced to position the variable pump 80 to its full pumping position too rapidly. For this reason, the pressure to the servo-ram position control motor 262 is limited by the reducing valve 274 and the operating pressure fluid to the ram 96 (FIGURE 6) of the servo-ram 82 is limited by reducing valve 282 and relief valve 284. Thus, if the vehicle is just starting to move, the high pressure in line 264 will cause the variable pump ring 35 (FIGURE 2) to react against the servo-ram action and to attempt to move in the direction of the force exerted by spring 62 (the motoring position) since the variable pump 80 has an inherent tendency to attempt to move toward the motoring position. The pressure in line 280 and line 272 being limited by the reducing valves 282 and 274, the variable pump 80 cannot be forced to the full pumping position while the pressure in line 264 is extremely high. This fact means that an extremely high load on motor 30 cannot cause a no-flow condition in line 264 and put a back-load on pumps 26 and 80 to stall the internal combustion engine 22.

When the vehicle overcomes its inertia of rest, and is in motion, the torque required by motor 30 will decrease, and accordingly, the pressure in line 264 will drop. When this pressure drops, the internal reaction on the ring cylinder 35 of variable pump 80 will decrease to the extent that the limited pressures in lines 272 and 280 can force the variable pump 80 to the full pumping condition. At high road speed, where flow in line 264 is high and back pressure in line 264 is low, the variable pump 80 can move to pump at its full capacity and both the fixed pump 26 and variable pump 80 will feed the high pressure line 264 to cause high speed rotation of motor 30.

If a high load is imposed upon the motor 30 while the vehicle is in motion, such as the condition existing when a steep up-grade is encountered, pressure in line 264 will build up due to the reduction in speed of motor 30 and the increased torque requirement of a higher load. The internal reaction of the variable pump 80 to this increase in pressure in line 264 will cause the variable pump ring 35 to shift slightly from the full pumping position it had assumed during high road speed so that the engine 22 will not be overloaded by the increased torque requirement and the engine r.p.m. will not be forced down below an efficient engine speed.

If the vehicle encounters a down grade, the circuit of FIGURE 5 will produce an engine braking action. When the grade is encountered, the driver removes his foot from the accelerator. The force of gravity will cause the vehicle to continue moving down the grade and motor 30 will act as a pump driven by the vehicle wheels. Under this condition, line 260 will be at a higher pressure than line 264, however the fixed pump output pressure in line 272 will still be sufficient to force the servo-spool toward a control position which causes the ram 96 to move the variable pump cylinder 35 toward the pumping position. The high pressure fluid in line 260 will enter line 288, past one-way valve 294, and communicate with the servo-ram inlet 99 (FIGURE 6) to cause the ram to force the variable pump 80 to the pumping position. Thus, all of the fluid pumped by motor 30 must pass through pumps 26 and 80 and into line 264, which means that the common shaft 25 of pumps 26, 28 and engine 22 will be rotated under the influence of the pumped fluid. When the common shaft 25 is thus rotated by flow from the motor 30, the engine 22 exerts a braking action on the shaft 25 due to engine compression. If the variable pump 80 were not forced to the pumping position when the vehicle was going down hill, it could not accept the fluid flowing in a direction from line 260 toward line 264.

When the driver applies the vehicle brake through pedal 300, the throttling valve 298 in motor exhaust line 260 is slowly closed and when the valve 298 is closed, there can be no further flow through motor 30. Thus, the engine only idles and circulates fluid from the fixed pump 26 through lines 264 and 46, through the variable pump 80, lines 38 and 260 and back to the fixed pump 26.

The purpose of one-way check valves 292 and 294 can readily be seen. These check valves allow the pressure of line 264 or line 260, whichever may be the higher pressure, to enter the servo-ram 82 of variable pump 80 without allowing fluid to by-pass between lines 264 and 260 via lines 280 and 288. The check valve 296 is provided to prevent fluid under high pressure when it exists in line 260, from entering the exhaust line 290 of the servo-ram 82 as the vehicle is going down hill.

The automotive transmission circuit of FIGURE 5 enjoys the advantages of the previously described circuits. It produces the effect of an expensive large capacity variable volume pump by using relatively inexpensive smaller pumps, and it provides an efficient by-pass, without a high power loss, for use in driving a fluid motor. No heat exchanger is required with this circuit.

The foregoing description of the three circuits is designed to show the adaptability of the basic dual pump regenerative circuit which serves as an efficient fluid by-pass for controlling a fluid motor. A primary inventive concept of this invention is the regenerative circuit disclosed in FIGURE 1 and further inventive aspects are disclosed in the various automatic control embodiments which can adapt the basic circuit to varying uses.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A hydraulic system comprising: a power input drive connection, a fixed displacement pump drive connected to said drive connection, a positive displacement power output fluid motor, pressure and return lines interconnecting said fixed displacement pump and motor, selectively operative means connected in fluid communication between said pressure and return lines and drive connected to said drive connection, selectively alternatively operative to aid the pump in supplying fluid to said pressure line or utilizing pressures from said pressure line to aid the power input to said drive connection by supplying regenerative torque power to said pump, and means for selectively operating said selectively operative means.

2. The circuit defined in claim 1 wherein said selectively operative means comprises a hydraulic device selectively operative as a pump or motor through a range of full pumping capacity through zero to full motoring capacity.

3. A regenerative hydraulic torque multiplication system comprising: a fixed capacity fluid pump, a variable positive capacity hydraulic device selectively variable to act as a pump or motor; an input power drive connection common to both said pump and said hydraulic device, said device when acting as a motor being capable of furnishing regenerative torque power through said drive connection back to said fixed capacity pump; a fluid motor; a fluid circuit embodying pressure and return lines, said pump, said hydraulic device, and said motor being connected in parallel between said lines; and means to control said variable capacity hydraulic device to enable selective action of said variable capacity device between a full motoring condition and a full pumping condition so the system will develop a low flow high pressure condition in the circuit when the variable capacity device is motoring and a high flow low pressure condition in the circuit when the variable capacity device is pumping.

4. A regenerative hydraulic torque multiplication system comprising: two fluid pumps, one of which is a fixed capacity pump and one of which is a variable positive capacity pump capable of being selectively varied to act as a motor; an input power drive connection common to both of said pumps, said variable capacity pump when acting as a motor being capable of furnishing regenerative torque power through said drive connection back to said fixed capacity pump; a fluid motor; a fluid circuit connecting said fixed capacity pump, said variable capacity pump and said motor in parallel; and means to control said variable capacity pump to enable selective action of said variable capacity pump between a full motoring condition and a full pumping condition so the system will develop a low flow high pressure condition in the circuit when the variable capacity pump is motoring and a high flow low pressure condition in the circuit when the variable capacity pump is pumping.

5. A regenerative hydraulic torque multiplication system comprising: two fluid pumps one of which is a fixed capacity pump and one of which is a variable displacement pump capable of being selectively varied to act as a motor; power means to vary the variable capacity pump; an input power drive connection common to both of said pumps; at least one positive displacement fluid motor; a fluid circuit connecting said fixed capacity pump, said variable displacement pump and said motor in parallel; and means responsive to at least one operating condition of the system to automatically control operation of said power means to enable selective change of the operating condition of said variable displacement pump to conditions between the limits of full motoring condition and full pumping condition so the system output can develop a low flow high pressure condition in the circuit with a feed back force from the variable displacement pump when the variable displacement pump is motoring and a high flow low pressure condition in the circuit when the variable displacement pump is pumping.

6. A regenerative hydraulic torque multiplication system as defined in claim 5, wherein said variable capacity pump is a vane type pump with a shiftable pump chamber cylinder spring loaded to a motoring position of the pump, said power means is a servo-ram device with a follow-up control valve and a fluid pressure supply means, and said condition responsive control means comprises at least one instrument controller, having a selectively changeable control device, responsive to a signal representative of an operating condition of the system to provide a second signal, and a servo-ram valve control motor means connected to said instrument controller and operated in response to said second signal.

7. In the system defined in claim 6, means connected to said fluid motor providing a signal proportional to motor speed and connected to said instrument controller to provide said signal representative of an operating condition of the system.

8. In the system defined in claim 6, means connected to the output flow circuit of said fixed displacement pump providing a signal based on fluid pressure in said output flow circuit and connected to said instrument controller to provide said signal representative of an operating condition of the system.

9. In the system defined in claim 8, a plurality of positive displacement fluid motors, fluid circuits for each of said fluid motors connected in parallel and each circuit comprising a flow control valve with power operating means, said condition responsive control means further comprises additional instrument controllers, one for each of said plurality of motors, each being responsive to a signal based on the speed of an associated fluid motor and providing a control force to the power operating means of the flow control valve in the circuit of the associated motor to maintain motor speed as required by said instrument controller.

10. A regenerative hydraulic torque multiplication system comprising: two fluid pumps one of which is a fixed displacement pump and one of which is a variable displacement pump capable of being selectively varied to act as a motor; an input power drive connection common to both of said pumps; a positive displacement fluid motor; a fluid circuit connecting said fixed displacement pump, said variable displacement pump and said motor in parallel; hydraulic servo-ram means to control said variable capacity pump to enable selective action of said variable capacity pump at stages between the limits of full motoring condition and full pumping condition so the system will develop a low flow high pressure condition in the circuit when the variable capacity pump is motoring and a high flow low pressure condition in the circuit when the variable capacity pump is pumping, said servo-ram means including a follow-up control valve and fluid pressure operated means to shift said control valve, and system control means comprising, a selectively variable control reference representative of desired motor speed, means to produce a signal responsive to an operating condition of the system, and means responsive to variations between said signal and said control reference to control the fluid pressure condition on said fluid pressure operated means so that the servo-ram is positioned in accord with the sensed system condition to control pump output and change the motor speed until its speed is as desired as set on said selective control reference.

11. A regenerative hydraulic torque multiplication system comprising: two fluid pumps one of which is a fixed displacement pump and one of which is a variable displacement pump capable of being selectively varied to act as a motor; an input power drive connection common to both of said pumps; a plurality of positive displacement fluid motors; a fluid circuit connecting said fixed displacement pump, said variable displacement pump and all of said motors in parallel; a flow control valve in independent controlling disposition in the circuit of each fluid motor; means to selectively and automatically control said variable capacity pump to enable automatic change of said variable capacity pump between a full motoring condition and a full pumping condition so the system will develop a flow condition in the circuit responsive to a desired pressure condition in the circuit representative of motor input pressures; and a plurality of selectively set automatic means for independent control of said flow control valves responsive to independent speed condition of the associated motors.

12. A system as defined in claim 11, wherein each individual assembly of a motor, its circuit flow control valve and selectively set automatic control means comprises: a power means to operate said flow control valve, a speed responsive signal producing device connected to said motor to produce a signal proportional to the motor speed and said automatic control means includes a selectively variable reference means, means to receive and compare said signal and said reference means and means responsive to variations between said signal and said reference means connected to operate said power means to change the setting of said flow control valve to vary the motor speed as desired.

13. A system as defined in claim 12 wherein hydraulic devices are provided to convey all condition responsive signals to, and to convey control functions from, all of said automatic control means.

14. A regenerative hydraulic torque multiplication system comprising: two fluid pumps, one of which is a fixed displacement pump and one of which is a variable displacement pump capable of being selectively varied to act as a motor; an input power drive connection common to both of said pumps; a positive displacement fluid motor; a fluid circuit including pressure and return conduits connecting said fixed displacement pump, said variable displacement pump and said motor in parallel; and means responsive to circuit output pressure to control said variable displacement pump to enable automatic regulation of said variable displacement pump from a full motoring condition to a full pumping condition so that the system will develop a low flow high pressure condition in the circuit when the variable capacity pump is motoring and a high flow low pressure condition in the circuit when the variable capacity pump is pumping; said control means including a servo-motor means connected to change the operating characteristics of said variable displacement pump, a fluid delivery circuit in fluid communication with both said pressure and said return conduits and the input to said servo-motor and including means for reducing the pressure into the delivery circuit from said pressure conduit, means to prevent interflow between said pressure and said return conduits through said delivery circuit and means to relieve high pressures in said delivery circuit to said return conduit.

15. A system as defined in claim 14 wherein the connections between said positive displacement motor and said pressure and return conduits include a reversing valve means to reverse motor operating direction.

16. A system as defined in claim 14 wherein a flow throttling valve, adapted to be operated by an automotive control device, is included in said return conduit between said motor and said pumps.

17. An automatic regenerative hydraulic torque multiplication system for variable load transmissions comprising: two fluid conduits; a fixed displacement fluid pump having an intake connected to one conduit and output connected to the other conduit; a controllable, variable displacement fluid pump having an operational characteristic tending to force it to a full motoring position, variably controllable to act as a motor with reverse flow condition, having an intake connection to said one conduit and an output connection to said other conduit; an input power drive connection common to both of said pumps; a positive displacement fluid motor having an intake connected to said other conduit and an exhaust connected to said one conduit; pump control means including power means to vary the variable capacity pump between motoring and pumping conditions and means for controlling position and actuation of said power means responsive to a pressure signal developed in accord with and representative of an operating condition of the system; and fluid communication means from said other conduit through said means controlling said power means for operation of said power means.

18. A system as defined in claim 17 wherein said fluid communication means from said other conduit comprises a delivery circuit having one branch connected to said pressure conduit and including a pressure reducing valve and a check valve permitting flow from said pressure conduit, a second branch connected to said return conduit and including a check valve preventing flow into said return conduit, a third branch connected to said power means, and a fourth branch connected to said return conduit and including a pressure relief valve.

19. A system as defined in claim 17 wherein said means for controlling the position and actuation of said power means includes: a fluid circuit from said fixed displacement pump outlet, including a pressure reducing valve and a fluid motor; and a feed back type control device connected in actuating relation to said power means including a spring biased expansible chamber fluid motor having its chamber connected to a branch of said fluid circuit downstream of said pressure reducing valve.

20. A system as defined in claim 17 wherein said pressure signal is developed in accord with the fluid pressure in said other conduit and is communicated from said other conduit.

References Cited in the file of this patent
UNITED STATES PATENTS

| | | |
|---|---|---|
| 1,996,466 | Ernst | Apr. 2, 1935 |
| 2,042,247 | Blood | May 26, 1936 |
| 2,161,439 | Thoma | June 6, 1939 |
| 2,234,775 | Parsons | Mar. 11, 1941 |
| 2,291,011 | Vickers | July 28, 1942 |
| 2,328,258 | Cannon | Aug. 31, 1943 |
| 2,618,932 | Taup | Nov. 25, 1952 |
| 2,764,941 | Miller et al. | Oct. 2, 1956 |
| 2,960,828 | Gould | Nov. 22, 1960 |